United States Patent
Akenine-Moller et al.

(10) Patent No.: US 9,357,236 B2
(45) Date of Patent: May 31, 2016

(54) COLOR COMPRESSION USING A SELECTIVE COLOR TRANSFORM

(71) Applicant: Intel Corporation, Santa Clara, CA (US)

(72) Inventors: Tomas G. Akenine-Moller, Lund (SE); Jim K. Nilsson, Lund (SE)

(73) Assignee: Intel Corporation, Santa Clara, CA (US)

( * ) Notice: Subject to any disclaimer, the term of this patent is extended or adjusted under 35 U.S.C. 154(b) by 106 days.

(21) Appl. No.: 14/207,941

(22) Filed: Mar. 13, 2014

(65) Prior Publication Data

US 2015/0264223 A1    Sep. 17, 2015

(51) Int. Cl.
| | |
|---|---|
| G06K 9/36 | (2006.01) |
| H04N 19/91 | (2014.01) |
| H04N 19/60 | (2014.01) |
| H04N 19/13 | (2014.01) |
| H04N 1/64 | (2006.01) |

(52) U.S. Cl.
CPC ............... *H04N 19/91* (2014.11); *H04N 1/64* (2013.01); *H04N 19/13* (2014.11); *H04N 19/60* (2014.11)

(58) Field of Classification Search
USPC .......... 382/166, 162, 167, 232, 171; 347/110; 345/589; 375/E7.013; 358/1.9, 448, 358/518

See application file for complete search history.

(56) References Cited

U.S. PATENT DOCUMENTS 5,812,169 A * 9/1998 Tai ........................ H04N 1/644
                                                    347/110

OTHER PUBLICATIONS

Clarberg, P., et al. "An optimizing compiler for automatic shader bounding." Computer Graphics Forum. vol. 29. No. 4. Blackwell Publishing Ltd., 2010, p. 1259-1268.

Rasmusson, J., et al., "Exact and error-bounded approximate color buffer compression and decompression." Graphics Hardware, 2007, p. 41-48.

* cited by examiner

*Primary Examiner* — Anh Do
(74) *Attorney, Agent, or Firm* — Trop Pruner & Hu, P.C.

(57) ABSTRACT

When a tile is evicted from the cache, an attempt is made to compress the tile using any compression algorithm. The difference is that the colors of the tile are compressed as they are, but the colors can also be transformed with a color transform (for example, lossless YCoCg), and after that those colors are compressed with the same compression algorithm. Several different color transforms may be tried, and selection of which one to use can be done in several ways.

27 Claims, 4 Drawing Sheets

US 9,357,236 B2

COLOR COMPRESSION USING A SELECTIVE COLOR TRANSFORM

BACKGROUND

This relates to graphics processing.

The reduction of memory bandwidth is of utmost importance, as energy efficiency is the performance factor that weighs most heavily when choosing a graphics architecture. Transactions over memory buses may cost several orders of magnitude more than computation in terms of energy and latency.

Hence, it is a common approach to attempt to reduce bandwidth usage with a bit of computation, resulting in less bandwidth usage than the original amount. This is the case for all sorts of color buffer compression.

For buffer compression, each tile (e.g., a rectangular region of pixels) must succeed in compressing the original data down to some threshold level if it is to be useful. For example, a tile that uses 1024 bits in uncompressed form may need to compress down to 512 bits if anything is to be gained from the compression. Hence, the more tiles that succeed at compressing to those thresholds (512 bits in this example), the less bandwidth to memory is used, i.e., the compression rate is important here. There may be several different thresholds, e.g., compressing from 2048 bits down to multiples of 512 bits: 1536 bits, or 1024 bits, or 512 bits. Obviously, they should be prioritized starting at the lowest threshold (i.e. 512 in this case).

A typical color buffer compression algorithm may find the minimum color components in the tile, and then use as few bits as possible to encode the residuals relative to the minimum color component per channel. Those schemes are sometimes called offset compression methods. Graphics application program interfaces (APIs) (OpenGL and DirectX) require that the color buffer is lossless, i.e., no information may be lost. Before offset compression is done, the colors for all pixels in a tile may be transformed using a color transform that decorrelates the information into a luminance component, and two chrominance components. Such a transform is the lossless YCoCg-transform. Transactions for the color buffers (including reading from an already rendered render target (RT) using a texture sampler) usually amount to the majority of the bandwidth in a typical graphics application. Hence, it is very important to attempt to increase the success rate of the compression method.

BRIEF DESCRIPTION OF THE DRAWINGS

Some embodiments are described with respect to the following figures.

DETAILED DESCRIPTION

Figure 1:
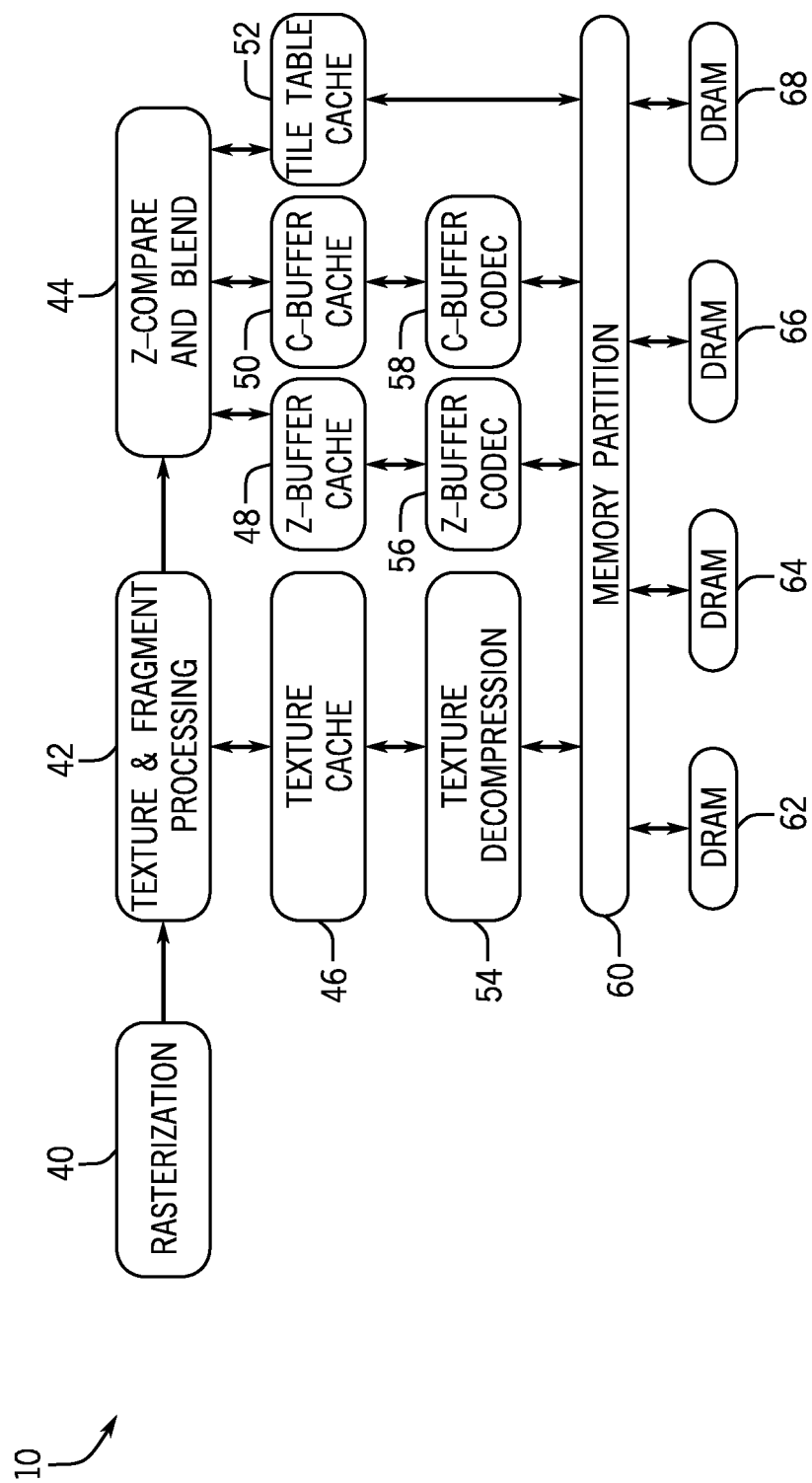
FIG. 1 is a schematic depiction of one embodiment.

When a tile is evicted from the cache, an attempt is made to compress the tile using any compression algorithm. The difference is that the colors of the tile are compressed as they are, but the colors can also be transformed with a color transform (for example, lossless YCoCg), and after that those colors are compressed with the same compression algorithm. Several different color transforms may be tried, and selection of which one to use can be done in several ways, which will be explained in more detail below. As an example, one can choose to use the color transform (including no transform) that gives a compressed representation with the fewest bits. Several methods allow for inexpensive selection of which transform to use.

Assume that there are N different lossless color transforms (where one of them is the identity transform, i.e., nothing is transformed at all). These transforms $T_i$, where $0 \le i < N$, and $T_0$ is the identity transform. Assume that the set of the original colors of a tile is denoted by o. Transforming the colors of a tile with a certain transform is denoted $T_i o$. Next, assume that we have a compression algorithm that works on a set of colors (transformed or not). The notation for compressing colors is C(o), and this function return the smallest numbers of bits that were needed to compress o with the compression algorithm, C. To compress a transformed tile of colors, do: $C(T_i o)$. The notation used is summarized below, including some examples:

o—original set of colors from the tile.
$T_i$—lossless color transform—assume there are N of those, and $0 \le i < N$.
C( )—compressor function with a set of colors as argument. Returns the number of bits needed to compress the colors of the argument.
Compressing a tile with a transform applied is done with:
$b_i = C(T_i o)$, where $b_i$ is the number of bits required to represent $T_i o$ using the compression algorithm at hand.
Conceptually, each transform, $T_i$ is applied to the original set of colors, o, with attempted compression of the transformed colors. So, the following is computed:
$b_i = C(T_i o)$, for all i such that $0 \le i < N$.
So, if N=2, then we compute: $b_0 = C(T_0 o)$ and $b_1 = C(T_1 o)$.

Now, find the index i that corresponds to $\min(b_0, b_1, \ldots, b_{N-1})$, i.e., find the transform that resulted in the fewest bits after compression. Then simply use the one with fewest bits (and then check if this succeeds in meeting any of the existing bit thresholds). Another option is to select the first compressor with $b_i$ less than some predefined threshold, e.g., 512 bits. Note that in the compressed representation for a tile, encode which transform was used for that tile. This is done with $\log_2(N)$ bits, and is simply prepended to the compression representation.

It might be expensive to apply the transforms, $T_i$, to the input colors, o, and also to compress all of these transformed sets of colors. While it is possible to perform the compression in this way, it would be convenient with a simpler and less expensive method.

To arrive at a solution, to compress a particular channel (red, green, blue, alpha, or Y, or Co, or Cg, for example), one often finds the minimum and the maximum value of the channel. Call these $C_{min}$ and $C_{max}$ for a particular channel, C. Some methods simply encode the channel's residuals with respect to $C_{min}$ and the number of bits to do that is $\operatorname{ceil}(\log_2(C_{max}-C_{min}))$. The sum of all channels' $\operatorname{ceil}(\log_2(C_{max}-C_{min}))$ is proportional to the number bits of the final compression representation. In general, this metric may be called the compressed size metric (CSM). When other color compression methods are used, this part of the technique needs to be adapted. For example, when the residuals are computed against either the minimum or the maximum, the CSM method obviously needs to be a little different.

Since this CSM involves computing the min and max of all channels (for all color transforms), this can still be considered an expensive operation, while certainly less expensive than performing the complete compression of a tile and counting the resulting number of bits. However, it is guaranteed to give the best compression success rate, so this approach may be preferable in some cases.

To make this even less expensive, several methods are described next.

First, the RGB to YCoCg transform is shown, which is reversible without loss (if Cg and Co are stored with one more bit compared to the original data):

$$Co = R - B \qquad t = Y - \lfloor Cg/2 \rfloor$$
$$t = B + \lfloor Co/2 \rfloor \qquad G = Cg + t$$
$$Cg = G - t \qquad \Longleftrightarrow \qquad B = t - \lfloor Co/2 \rfloor$$
$$Y = t + \lfloor Cg/2 \rfloor \qquad R = B + Co$$

Simply take M representative colors from the tile (for example, the four corners of the tile, which would mean M=4), and perform the color transform, and then perform the CSM method only on these M colors. Using the CSM technique above, where residuals only are computed against the $C_{min}$, then find the min and max of only these M colors, and estimate the cost in bits by summing all channels' ceil($\log_2$ ($C_{max}-C_{min}$)) for these M colors. This is certainly cheaper since a tile may contain 16 or 32 colors, for example. The color transform which gives the lowest estimation of cost in bits is then used to transform the remaining colors, and then the algorithm continues as usual.

However, this is a prediction, and so it may not provide compression success rates that are exactly as good as the brute force method (of transforming using all color transforms, and compressing all of those transformed colors).

This also extends easily to using a set of color transforms.

These techniques reduce most color compression schemes by a substantial amount of bandwidth, and this translates directly to power savings (or performance improvements). Since memory bandwidth usage amounts to a large percentage of the overall energy consumption of a graphics processor, it is clearly significant.

In FIG. 1, a graphics processor 10 may include a rasterization pipeline including a rasterization unit 40, a texture and fragment processing unit 42, and a depth or Z compare and blend unit 44. Each of these units may be implemented in whole or in part by software or hardware in some embodiments.

The texture and fragment processing unit 42 is coupled to a texture cache 46. The cache 46 is in turn coupled to a memory partition 60 through a texture decompression module 54. Thus, texture information stored in the cache may be decompressed between the memory partition and the cache.

The depth compare and blend unit 44 is coupled to a depth buffer cache 48, a color buffer cache 50 and a tile table cache 52. In turn, the depth buffer cache 48 is coupled to the memory partition 60 through the depth buffer coder/decoder (codec) 56. Likewise, the color buffer cache 50 couples the memory partition 60 through the color buffer coder/decoder (codec) 58. The memory partition 60 may be coupled to dynamic random access memory (DRAM) 62, 64, 66 and 68 which may be part of system memory. In some embodiments, a unified cache may be used that includes the texture cache, the depth buffer cache and the color buffer cache.

In some embodiments, a unified codec may replace the units 54, 56, and 58. Various configurations are described in further detail in the article, *Floating Point Buffer Compression in a Unified Codec Architecture* by Ström, et al. Graphics Hardware (2008).

Figure 2:
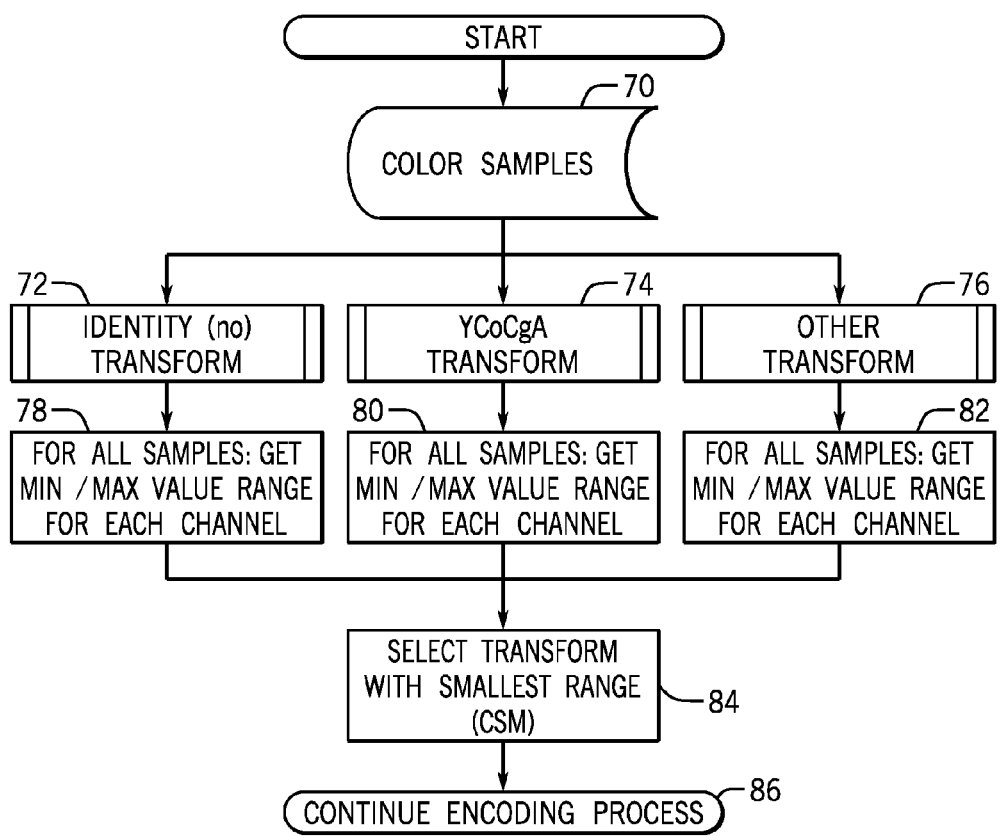
FIG. 2 is a flow chart for one embodiment.

Referring to FIG. 2, a compression sequence may be implemented in software, firmware and/or hardware. In software and firmware embodiments, it may be implemented by computer executed instructions stored in one or more non-transitory computer readable media, such as magnetic, optical or semiconductor storages.

The sequence shown in FIG. 2 begins by receiving color samples at 70 when a tile is evicted from the cache. The color samples received are then subjected to the color transform may be YCoCgA transform, as indicated in block 74, or some other transform, as indicated in block 76. Also, no transform (i.e. an identity transform) may be used, as indicated at 72. Several different color transforms may be tried and the selection of which transform to use can be done in several ways. The transform or absence of a transform that gives a compressed representation with the fewest bits may be selected in one embodiment.

If there is no transform, then, for all samples obtained, the minimum and/or maximum value range for each channel, as indicated in block 78. In the case of the YCoCgA transform, for all samples get the minimum and/or maximum value in the range for each channel, as indicated in block 80. Likewise, if some other transform is used, the same value range is obtained for each channel, as indicated in block 82. Then the transform is selected with the smallest range, called the compressed size metric, as indicated in block 84, and encoding is continued, as indicated in block 86.

When stochastic rasterization is used, the triangle vertices are functions of the time/lens position. In this case, we choose to compute exact derivatives at each samples location in 5D space. This is slightly more involved since we cannot rely on precomputed interpolation coefficients.

Figure 3:
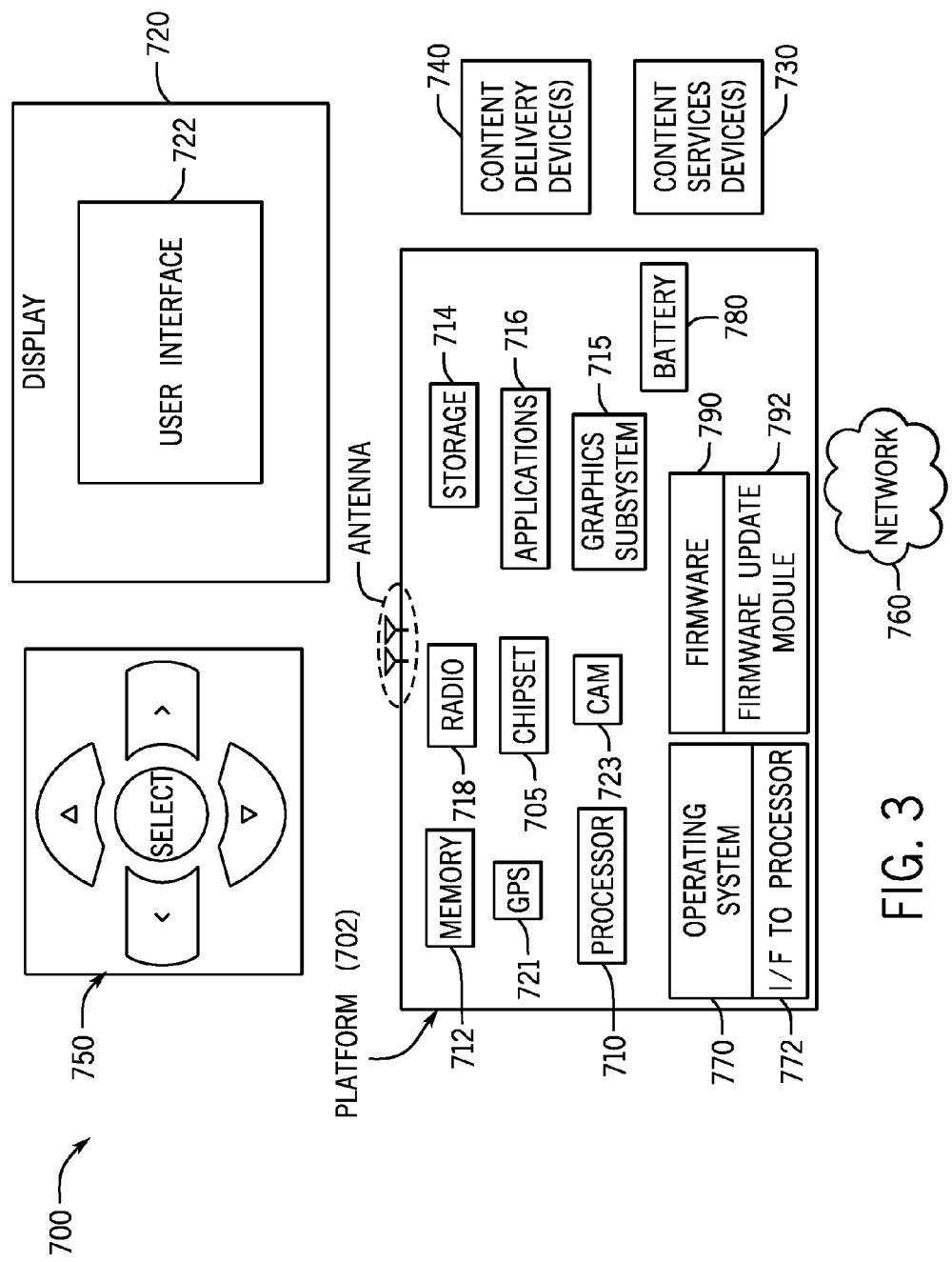
FIG. 3 is a system depiction of one embodiment.

FIG. 3 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 2 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
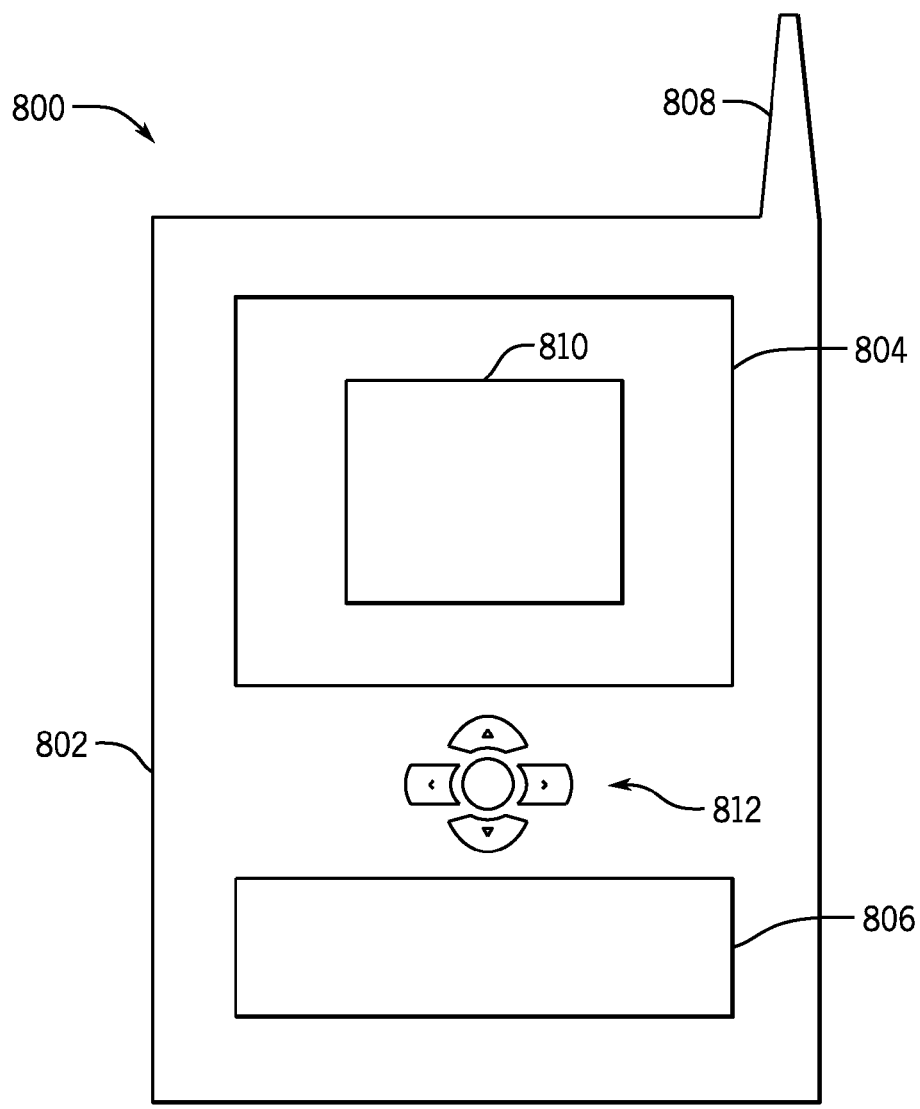
FIG. 4 is a front elevational view of one embodiment.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIG. 2 in software and/or firmware embodiments.

As shown in FIG. 4, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following clauses and/or examples pertain to further embodiments:

One example embodiment may be a method comprising applying, using a graphics processor, at least two color transforms to an original set of colors, attempting to compress the transformed colors, and based on the compression results, selecting one of the two color transforms or to use no transforms at all. The method may also include selecting the transform with the fewest bits after compression. The method may also include selecting the transform that results in less than a predefined threshold of bits. The method may also include encoding the selected color transform in a compressed representation. The method may also include finding a minimum and maximum compression for a given channel. The method may also include finding a compressed size metric by summing the ceil of the maximum minus the minimum value for the channel. The method may also include finding a compressed size metric by summing the ceil of the maximum minus the minimum value for the channel. The method may also include selecting M representative colors of a tile, performing the color transform and then computing the compressed size metric only on the M colors. The method may also include wherein selecting one of the two color transforms includes selecting an identity transform.

Another example embodiment may be one or more non-transitory computer readable media storing instructions executed by a processor to perform a sequence comprising applying, using a graphics processor, at least two color transforms to an original set of colors, attempting to compress the transformed colors, and based on the compression results, selecting one of the two color transforms or to use no transforms at all. The media may include said sequence including selecting the transform with the fewest bits after compression. The media may include said sequence including selecting the transform that results in less than a predefined threshold of bits. The media may include said sequence including encoding the selected color transform in a compressed representation. The media may include said sequence including finding a minimum and maximum compression for a given channel. The media may include said sequence including finding a compressed size metric by summing the ceil of the maximum minus the minimum value for the channel. The media may include said sequence including selecting M representative colors of a tile, performing the color transform and then computing the compressed size metric only on the M colors. The media may include wherein selecting includes selecting an identity transform.

In another example embodiment may be an apparatus comprising a processor to apply, at least two color transforms to an original set of colors, attempt to compress the transformed colors, and based on the compression results, select one of the two color transforms, and a storage coupled to said processor. The apparatus may include said processor to select the transform with the fewest bits after compression. The apparatus may include said processor to select the transform that results in less than a predefined threshold of bits. The apparatus may include said processor to encode the selected color transform in a compressed representation. The apparatus may include said processor to find a minimum and maximum compression for a given channel. The apparatus may include said processor to find a compressed size metric by summing the ceil of the maximum minus the minimum value for the channel. The apparatus may include said processor to select M representative colors of a tile, performing the color transform and then computing the compressed size metric only on the M colors. The apparatus may include said processor to select an identity transform as one of said two transforms. The apparatus may include a display communicatively coupled to the processor. The apparatus may include a battery coupled to the processor. The apparatus may include firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   applying, using a graphics processor, at least two color transforms to an original set of colors;
   performing a compression operation to obtain compression results on the transformed colors; and
   based on the compression results, selecting between using a selected one of the two color transforms and using no transforms at all.

2. The method of claim 1 including selecting the transform with the fewest bits after compression.

3. The method of claim 2 including selecting the transform that results in less than a predefined threshold of bits.

4. The method of claim 1 including encoding the selected color transform in a compressed representation.

5. The method of claim 1 including finding a minimum and maximum compression for a given channel.

6. The method of claim 5 including finding a compressed size metric by summing the ceil of the maximum minus the minimum value for the channel.

7. The method of claim 6 including selecting M representative colors of a tile, performing the color transform and then computing the compressed size metric only on the M colors.

8. The method of claim 1 wherein selecting one of the two color transforms includes selecting an identity transform.

9. One or more non-transitory computer readable media storing instructions executed by a processor to perform a sequence comprising:
   applying, using a graphics processor, at least two color transforms to an original set of colors;
   performing a compression operation to obtain compression results on the transformed colors; and
   based on the compression results, selecting between using a selected one of the two color transforms.

10. The media of claim 9 said sequence including selecting the transform with the fewest bits after compression.

11. The media of claim 9 said sequence including selecting the transform that results in less than a predefined threshold of bits.

12. The media of claim 9 said sequence including encoding the selected color transform in a compressed representation.

13. The media of claim 9 said sequence including finding a minimum and maximum compression for a given channel.

14. The media of claim 13 said sequence including finding a compressed size metric by summing the ceil of the maximum minus the minimum value for the channel.

15. The media of claim 14 said sequence including selecting M representative colors of a tile, performing the color transform and then computing the compressed size metric only on the M colors.

16. The media of claim 9 wherein selecting includes selecting an identity transform.

17. An apparatus comprising:
   a processor to apply, at least two color transforms to an original set of colors, performing a compression operation on the transformed colors, and based on the compression results, select one of the two color transforms; and
   a storage coupled to said processor.

18. The apparatus of claim 17 said processor to select the transform with the fewest bits after compression.

19. The apparatus of claim 18 said processor to select the transform that results in less than a predefined threshold of bits.

20. The apparatus of claim 17 said processor to encode the selected color transform in a compressed representation.

21. The apparatus of claim 17 said processor to find a minimum and maximum compression for a given channel.

22. The apparatus of claim 21 said processor to find a compressed size metric by summing the ceil of the maximum minus the minimum value for the channel.

23. The apparatus of claim 22 said processor to select M representative colors of a tile, performing the color transform and then computing the compressed size metric only on the M colors.

24. The apparatus of claim 17 said processor to select an identity transform as one of said two transforms.

25. The apparatus of claim 17 including a display communicatively coupled to the processor.

26. The apparatus of claim 17 including a battery coupled to the processor.

27. The apparatus of claim 17 including firmware and a module to update said firmware.

* * * * *